US006509981B1

(12) United States Patent
Shih

(10) Patent No.: US 6,509,981 B1
(45) Date of Patent: Jan. 21, 2003

(54) OPTICAL MEDIA ACCESS DEVICE WITH IMAGE SCANNING FUNCTION

(75) Inventor: Cader Shih, Chu-Dong (TW)

(73) Assignee: Microtek International Inc., Hsinchu (TW)

( * ) Notice: Subject to any disclaimer, the term of this patent is extended or adjusted under 35 U.S.C. 154(b) by 0 days.

(21) Appl. No.: 09/401,647

(22) Filed: Sep. 23, 1999

(30) Foreign Application Priority Data

May 26, 1999 (TW) ........................................ 88108885 A

(51) Int. Cl.⁷ ................................................ H04N 1/04
(52) U.S. Cl. ........................ 358/474; 358/496; 361/686
(58) Field of Search ................................ 358/474, 496, 358/400, 471, 473, 442; 361/685, 686

(56) References Cited

U.S. PATENT DOCUMENTS

| | | | | |
|---|---|---|---|---|
| 5,663,812 A | * | 9/1997 | Pan | 358/474 |
| 5,663,813 A | * | 9/1997 | Pan | 358/474 |
| 5,742,407 A | * | 4/1998 | Albrecht et al. | 358/496 |
| 5,790,278 A | * | 8/1998 | Ehrne et al. | 358/496 |
| 5,818,611 A | * | 10/1998 | Shih | 358/474 |
| 5,850,296 A | * | 12/1998 | Wang et al. | 358/474 |
| 6,031,798 A | * | 2/2000 | James et al. | 369/34 |
| 6,084,691 A | * | 7/2000 | Tsai et al. | 358/474 |
| 6,141,119 A | * | 10/2000 | Tseng et al. | 358/498 |

* cited by examiner

Primary Examiner—Cheukfan Lee
(74) Attorney, Agent, or Firm—Bacon & Thomas, PLLC

(57) ABSTRACT

An optical media access device with image scanning function is provided. The optical media access device comprises a fixed housing mountable into a computer; a moveable housing moveably disposed within the fixed housing; a first driving mechanism used to drive the moveable housing to move within the fixed housing; an optical media access module disposed within the moveable housing, having an optical head, an optical head driving mechanism; a tray for holding an optical disc, a second driving mechanism to drive the tray, and a rotating mechanism to rotate the optical disc; a control panel mounted at the front end of the moveable housing, having a plurality of keys to control the actions of the optical media access device; a scanning module mounted closely to the front end of the movable housing to scan document images; and a control module for controlling the action of the optical media access module and the scanning module.

4 Claims, 7 Drawing Sheets

OPTICAL MEDIA ACCESS DEVICE WITH IMAGE SCANNING FUNCTION

BACKGROUND OF THE INVENTION (a) Field of the Invention

The present invention relates to a media access device, and in particular, to an optical media access device with image scanning function.

(b) Description of the Prior Art

Expression of information has been developed from simple word description to videoaudio multimedia expression following the fast development of computer industries. Since audio-video multimedia can record large volume of information, such as image, sound, and animation, etc, a relative large memory device is required to store these information. Thus, various types of multimedia access devices, such as CD-ROM, DVD-ROM and DVD-RAM are developed to fulfill the demands of users.

Beside, in order to take images of documents, for instance, photographs, image scanning devices are commonly used. Conventional scanning devices include flat bed scanner, sheetfeed scanner, built-in scanner, or hand-held scanner etc. However, if the scanner is merely used for scanning photographs, name cards or documents of small size, a built-in scanner or hand-held scanner can be selected, whereas, a flat bed scanner and sheet-feed scanner occupy larger space.

In view of the above devices, these devices need to have an optical media access device and an image input device in order to provide both the optical media accessing function and image input function. However, these devices require a high cost of production and occupy a larger space.

SUMMARY OF THE INVENTION

Accordingly, it is an object of the present invention to provide an optical media access device with image scanning function, which can overcome the above mentioned drawbacks.

An aspect of the present invention is to provide an optical media access device with image scanning function comprising a fixed housing mountable to a floppy bay within a computer; a moveable housing moveably disposed within the fixed housing; a first driving mechanism used to drive the moveable housing to move within the fixed housing; an optical media access module being disposed within the moveable housing having an optical head, an optical head driving mechanism, a tray for holding optical disc, a second driving mechanism to drive the moving of the tray, and a rotating mechanism to rotate the optical disc; a control panel being mounted at the front end of the moveable housing and having a plurality of keys to control the action of the optical media access device; a scanning module being mounted at close proximity to the front end of the moveable housing to scan document images; and a control module for controlling the action of the media access module and the scanning module.

BRIEF DESCRIPTION OF THE DRAWINGS

The invention is pointed out with particularly in the appended claims. However, other features of the invention will become more apparent and the invention will be best understood by referring to the detailed description of the present invention in conjunction with the accompanying drawings in which:

DETAILED DESCRIPTION OF THE PREFERRED EMBODIMENT

Figure 1:
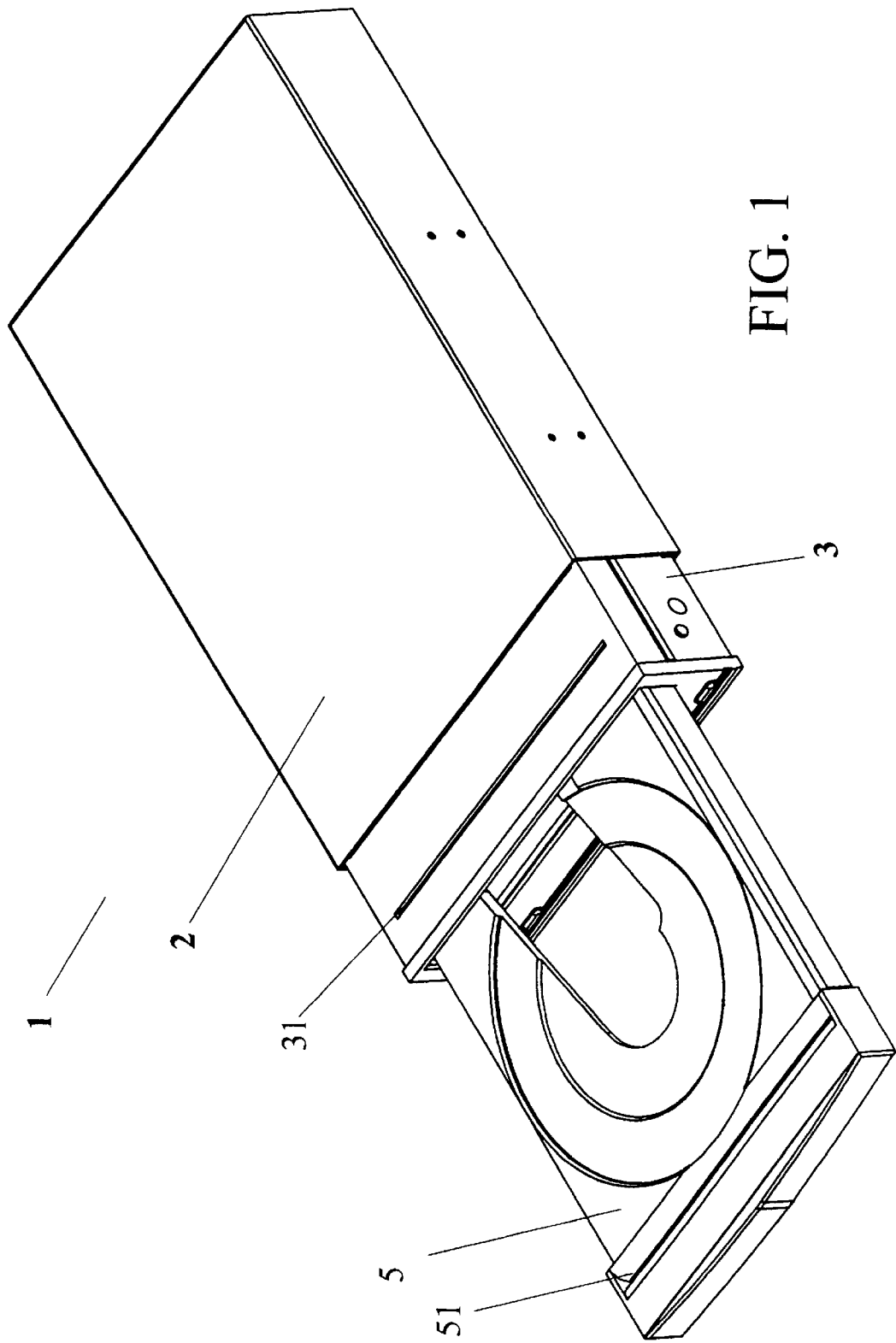
FIG. 1 is a perspective view of an optical media access device with image scanning function in accordance with the present invention, showing the moveable housing located at the outside of the fixed housing and the tray being moved to the outside of the moveable housing.
Figure 2:
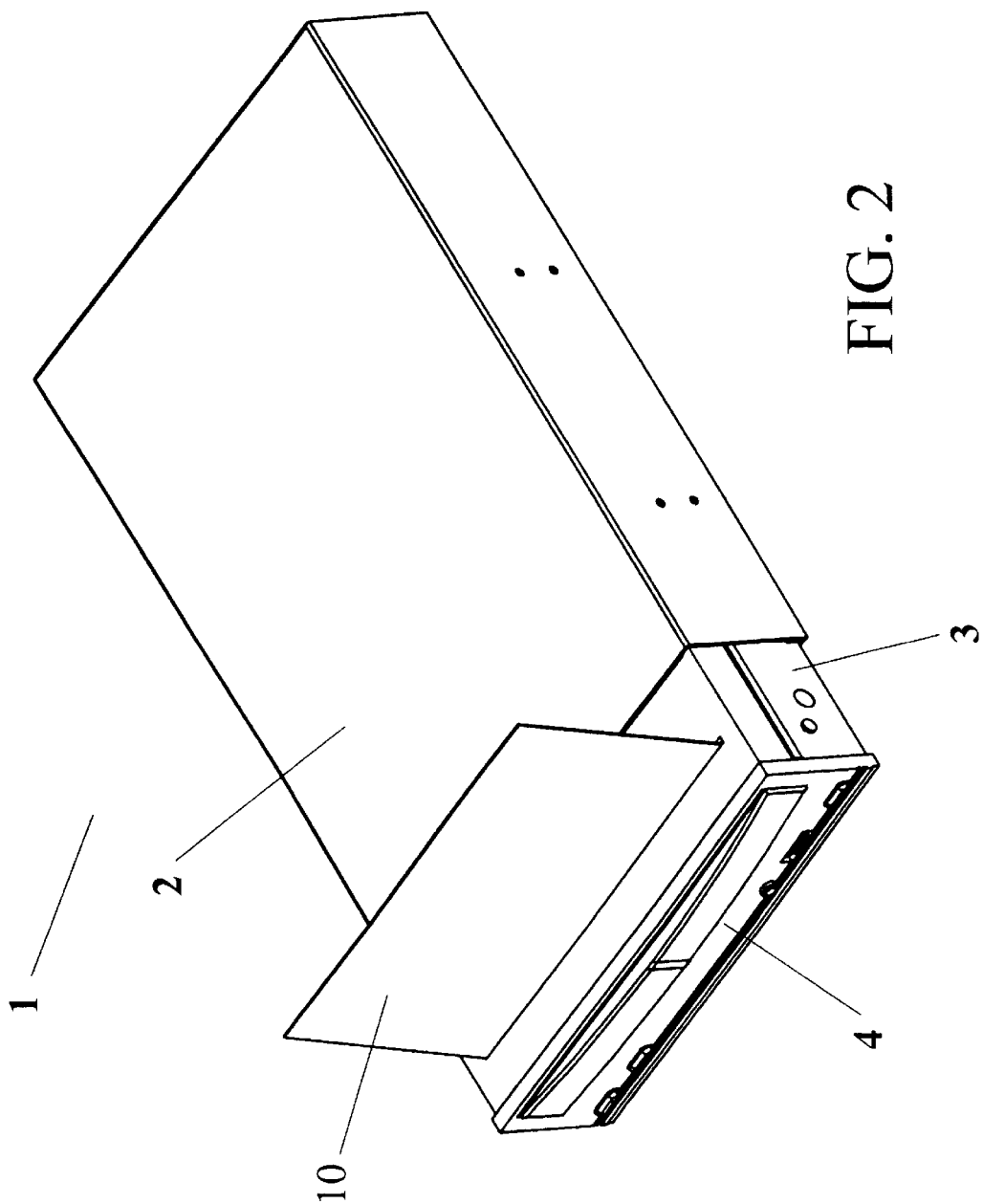
FIG. 2 is a perspective view of an optical media access device with image scanning function in accordance with the present invention, showing the moveable housing being moved to the outside of the fixed housing during scanning.

Referring to FIGS. 1 and 2, a perspective view of an optical media access device 1 with image scanning function. FIG. 1 shows the moveable housing located at the outside of the fixed housing and the tray being moved to the outside of the moveable housing. FIG. 2 shows the device 1 at scanning position. As shown in the figures, the media access device 1 comprises a fixed housing 2 mountable into a floppy bay within a computer (not shown); a moveable housing 3 being moveably disposed within the fixed housing 2; a control panel 4 mounted at the front end of the moveable housing 3 and having a plurality of operational keys for the operation of the user; a tray 5 moveably disposed within the moveable housing 3 and used for the holding of optical disc for data storage.

As shown in the figures, the fixed housing 2 is made from metallic material and is provided with a mounting hole such that the fixed housing 2 can be disposed within the mounting slot of a computer. The way of mounting the fixed housing 2 is similar to the mounting of an optical driver. The fixed housing 2 is functioned to protect the parts within the housing 2 and also is used to shield interference of electromagnetism.

In accordance with the present invention, the moveable housing 3 is moveably disposed in relation to the fixed housing 2. Before scanning action is activated, the moveable housing 3 moves towards the outer edge to let the document gate 31 protruded out from the fixed housing 2 such that the document 10 is input via the document gate 31 (as shown in FIG. 2) and proceeds to scanning by CIS module 61. Before the scanning process, the tray 5 needs to be returned to the moveable housing 3.

Figure 3:
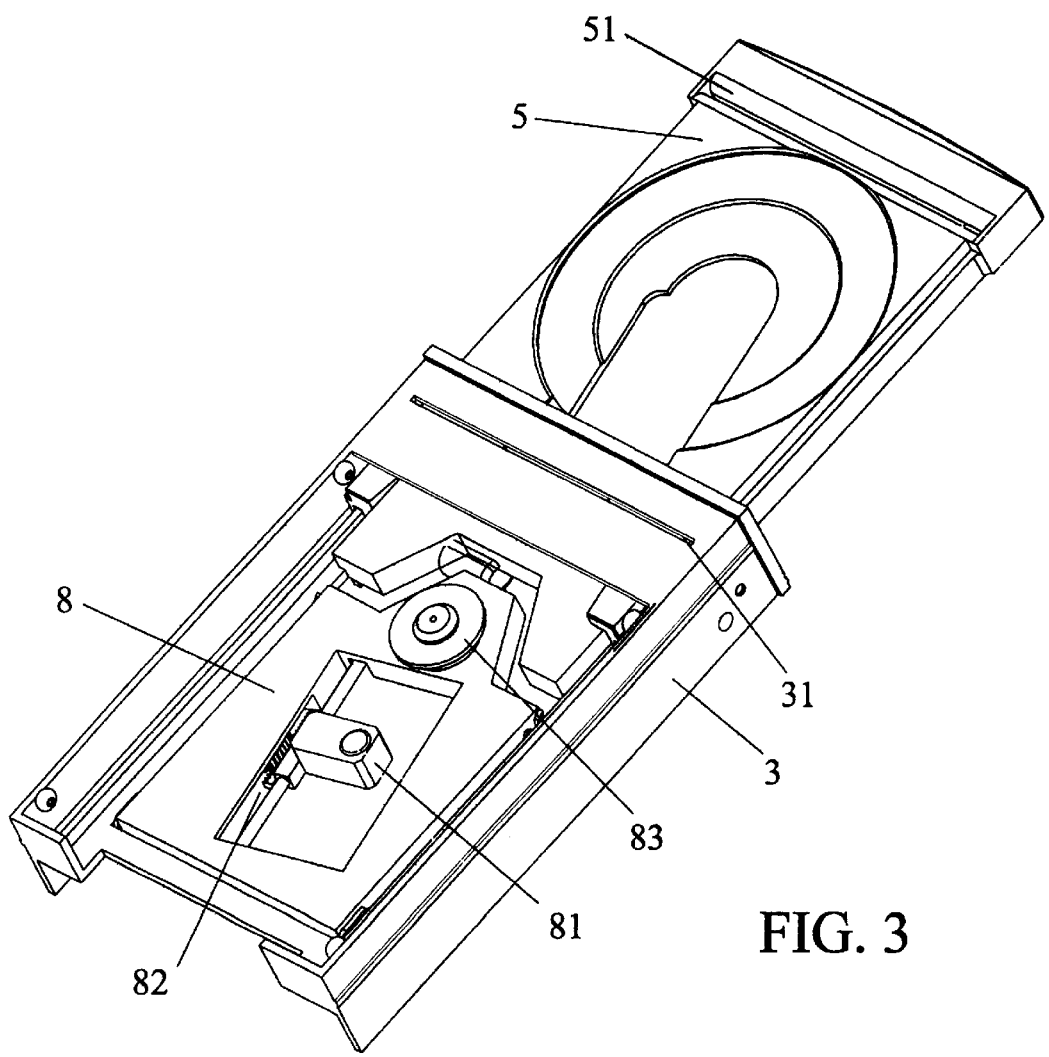
FIG. 3 is a perspective view of the tray and the moving mechanism of the moveable housing, wherein the fixed housing is omitted.
Figure 4:
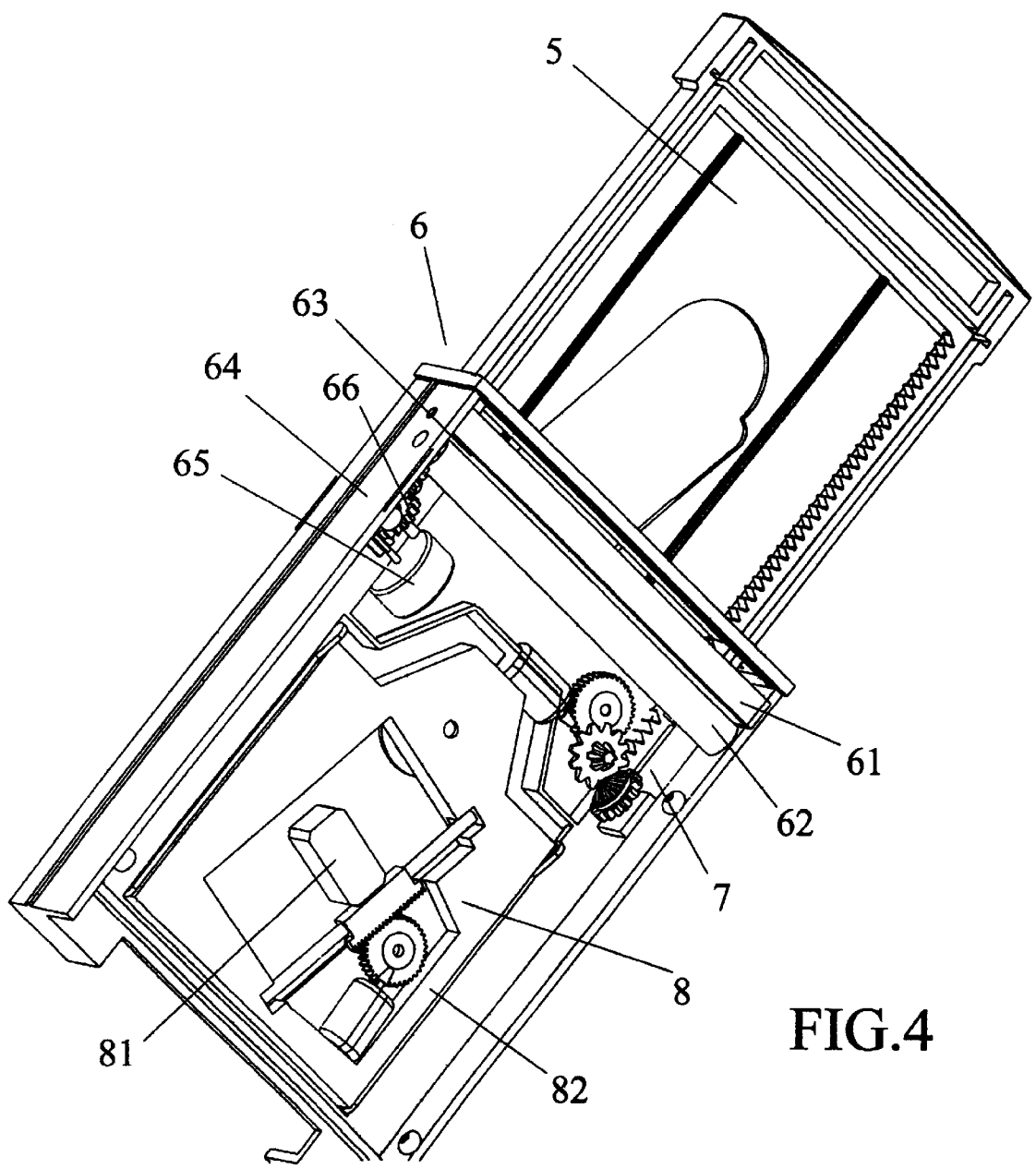
FIG. 4 is an another perspective view of the tray and the moving mechanism of the moveable housing, wherein the fixing housing is omitted.

Referring to FIGS. 3 and 4, the internal mechanism of the media access device 1 is shown. As shown in the figures, the media access device 1 includes a scanning module 6 being mounted closely to the control panel within the moveable housing 3 to scan image of a document; an optical access module 8 mounted within the moveable housing 3 to read data from or write in data to the optical disc; and a driving mechanism 7 to drive the moveable housing 3 and the tray 5.

In accordance with the present invention, the scanning module 6 includes a CIS module 61, a roller 62, paper-feeding path 63 formed from the CIS module 61 and the roller 62, and a roller driving mechanism 64 to rotate the driving roller 62. The CIS module 61 is used to convert document images into electrical signals, and the roller 62 is used to drive the document so that the document passes through the image access region on the surface of the CIS module 61.

In addition, the moveable housing 3 at the position corresponding to the paper-feeding path 63, forms a document gate 31 (referring to FIG. 1) so that to allow the document to enter into the paper-feeding path 63 from the document gate 31.

Simultaneously, the tray 5, at the position corresponding to the paper-feeding path 63, forms into a further document funnel 51 to allow the document to enter the paper-feeding path 63 from the document funnel 51. Thus, the document 10 to be scanned can pass through document gate 31 and enter into the scanning position via the document funnel 51 of the tray 5 and the paper-feeding path 63. At the initial of the scanning, the motor 65 rotates the roller 62 using the roller driving mechanism 64 through the gear 66, and the document 10 to be scanned slides across the surface of the CIS module 61. The image scanned by the CIS module 61 is transmitted to the connected computer device by the control module. The scanning module uses the CIS module 61 to obtain image. Since the size of the CIS module 61 is small and needs no other optical elements, for instance, a reflective mirror or lens, therefore, it can be mounted at the front end of the media access device 1 without affecting the accessing function of the optical media.

In accordance with the present invention, the optical access module 8 includes an optical head 81, an optical head driving mechanism 82, and an optical disc driving mechanism 83. The optical head 81 is used to write data into the optical disc, or read data from the optical disc. Commonly, the optical head 81 is a laser head. The optical disc driving mechanism 82 is used to drive optical head 81, corresponding to the position of the optical disc. The optical disc driving mechanism 83 is used to rotate the optical disc. The optical access module 8 has the function of a CD-ROM, DVD-RAM or DVD-ROM. As the action of the optical access module 8 and the method of controlling the optical access module 8 are conventional techniques applied to the optical drivers (CD-ROM, DVD-ROM), therefore, further description of this technique is hereby omitted.

Figure 7:
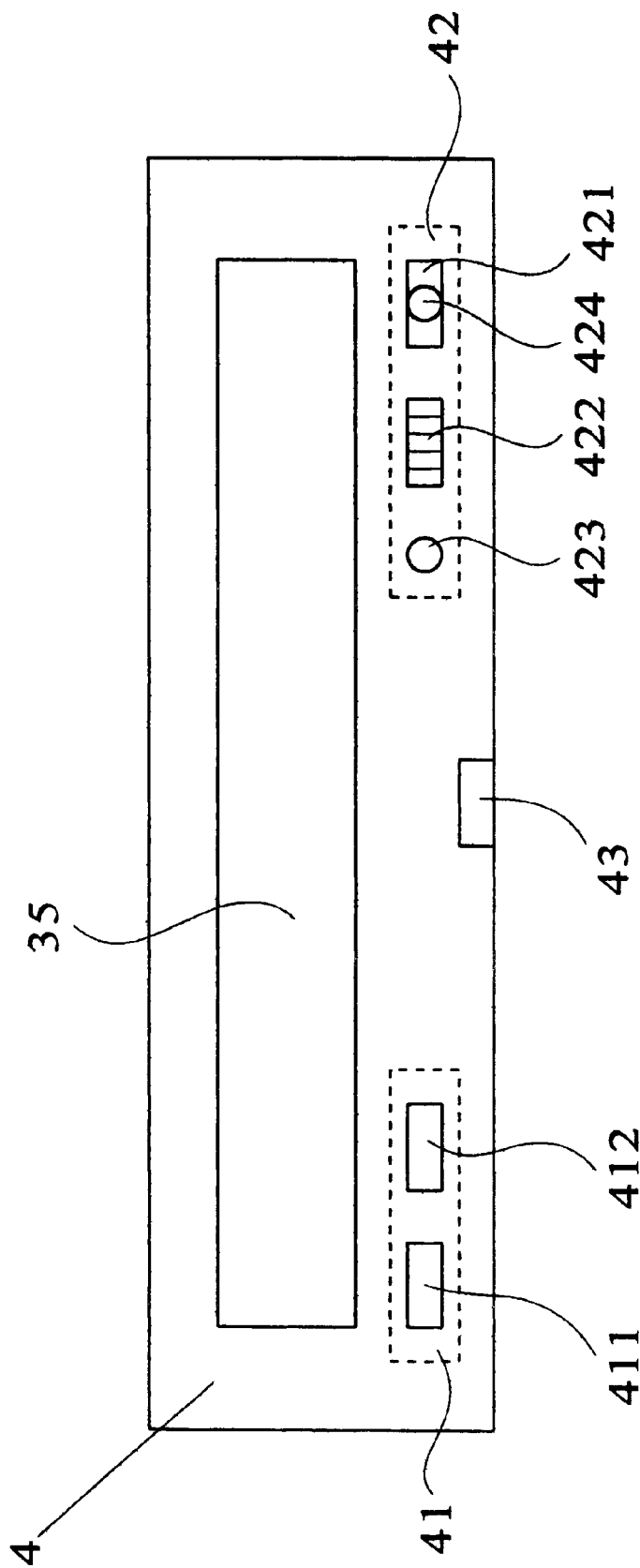
FIG. 7 is a front view of the control panel of the optical media access device with image scanning function.

Referring to FIG. 7, there is shown the mode of control panel 4 of the media access device 1 of the present invention. The control panel 4 includes two groups of control function keys. The first group control key 41 is used to control the action of image taking, and includes an execution key 411 and a moveable key 412 which can move the moveable housing. The second group control key 42 is used to control the media accessing action, and includes a tray moving key 421, a sound controlling key 422, and a sound signal output hole 423.

The number of control keys can be increased or decreased depending on requirements of the user. In addition, the control panel 4 further includes a press button 43 joined to the roller 62 and is used to push the roller 62 of the scanning module 6, so as to allow the document within the paper-feeding path 63 to slide downward and out of the paper-feeding path 63 in order to release any jammed paper.

Figure 5:
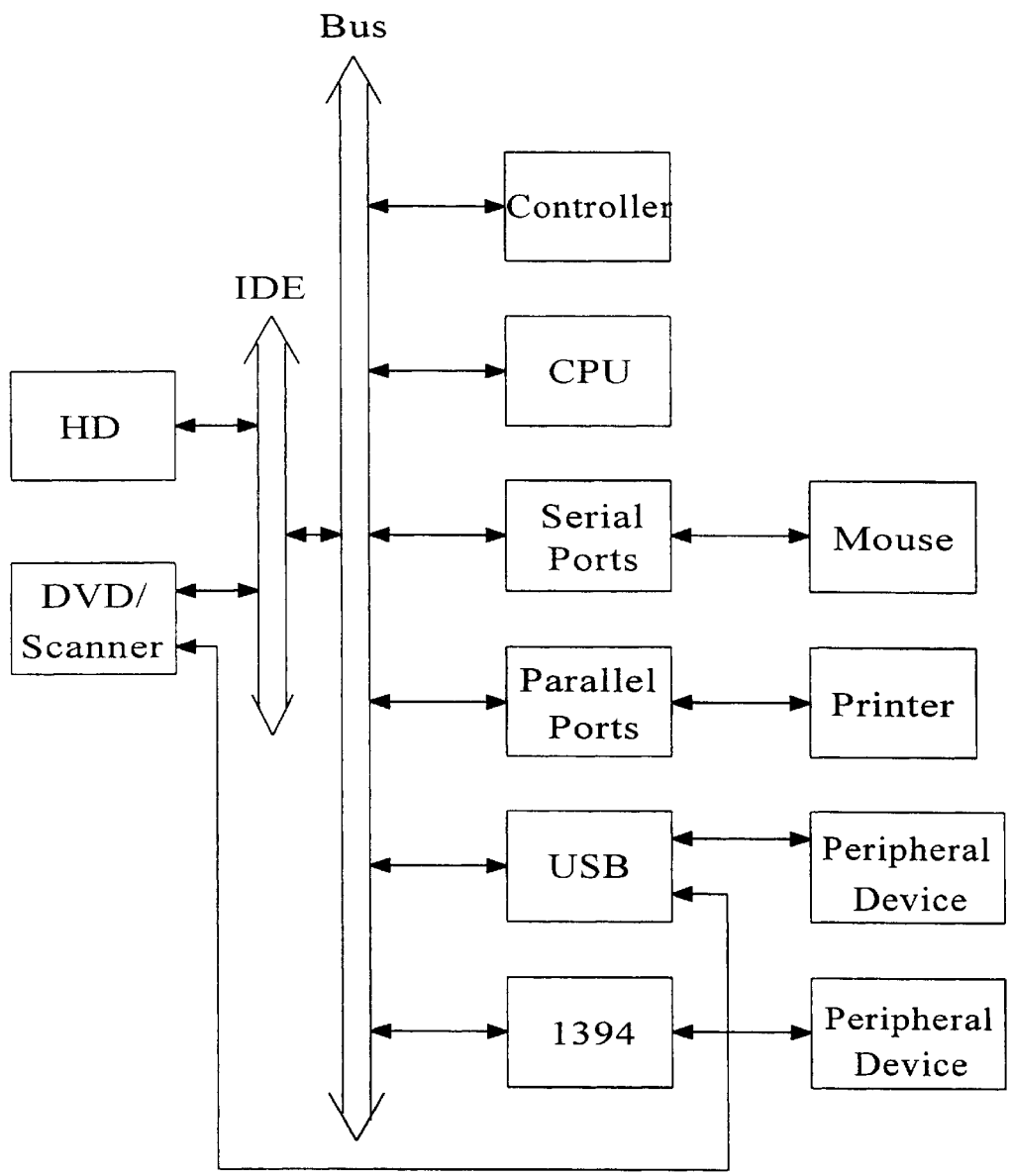
FIG. 5 is a block diagram of the optical media access device with image scanning function which is linked to the computer device.

Referring to FIG. 5, there is shown a block diagram of the media access device 1 being mounted into the computer device. The computer device includes an IDE Bus, a common Bus, a CPU, a controller, a serial port, a parallel port etc. As shown in the figure, the media access device 1 of the present invention is provided with an IDE interface, which can be simultaneously mounted together with the hard disk driver (HD) to the IED Bus of the computer device, in order to provide transmission of optical disc information. In addition, the media access device 1 is further provided with an USB output port which can be linked to the USB interface in order to provide transmission of the scanning information. The scanning information can also be linked to the computer device through the IDE interface. Recently, the application of the 1394 interface gradually becomes popular. The present invention can also be linked to the computer device via the 1394 interface.

Figure 6:
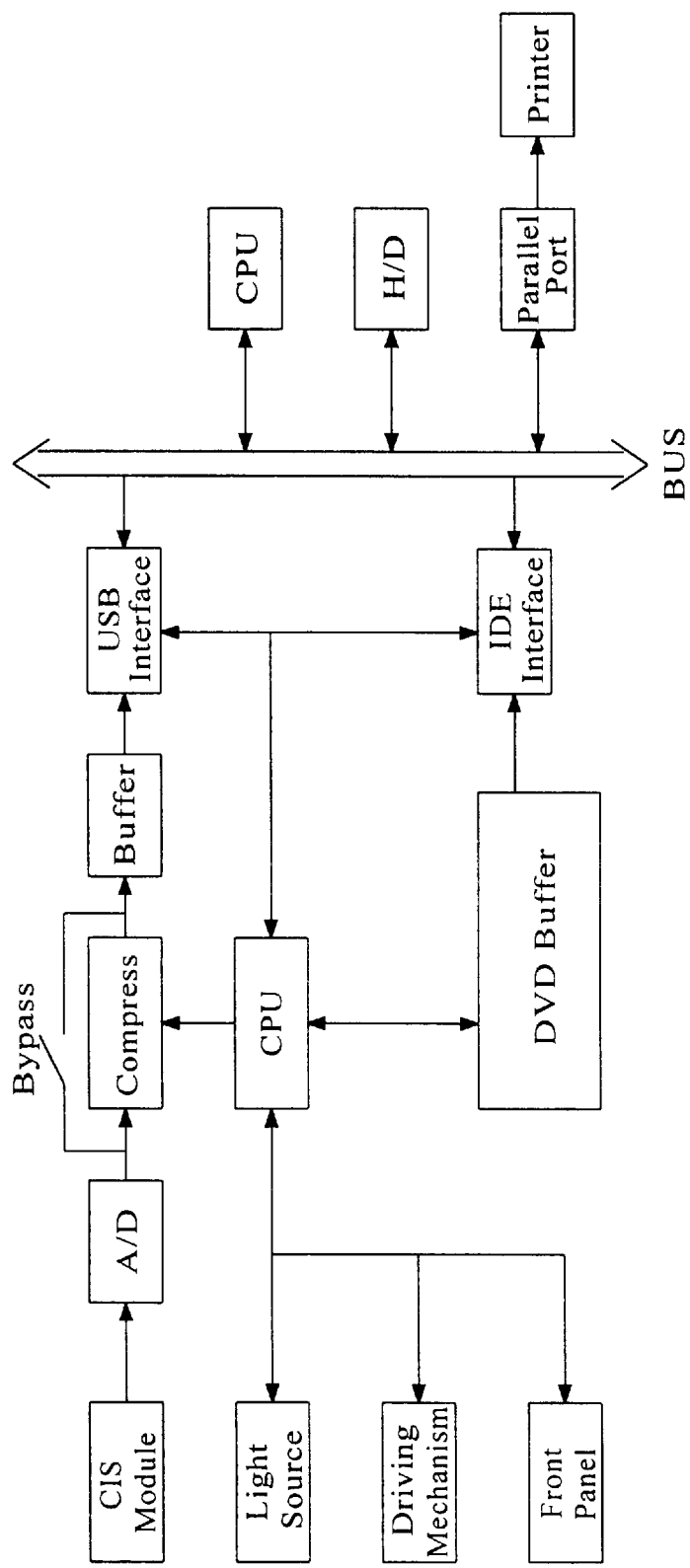
FIG. 6 is a circuit block diagram of the optical media access device with image scanning function.

FIG. 6 is a block diagram showing the control module of the media access device of the present invention. As shown in FIG. 6, the media access device 1 further includes the control module, which is used to control the scanning module 6 and the action of the optical access device 8. The control module includes a CPU, a A/D, a compression module, a buffer, a USB interface, a DVD buffer, and a IDE interface. The CPU is used to control the entire action, and to control the light source device of CIS module, and the driving mechanism, and also to receive signals of the individual keys of the control panel 4. The light source device provides light source for the CIS module 61 and the driving mechanism 82 is used to drive the roller 62, the moving of the tray 4, and to move the moveable housing 3.

The present preferred embodiment of the optical media access device employs the combination of a scanning module 6 with a data access module with shared housings and shared control circuit. Thus, space is saved and the cost of production is lowered.

It will be apparent to those skilled in the art that the above disclosed invention may be modified in numerous ways. Accordingly, it is intended by the appended claims to cover all modifications of the invention which fall within the true spirit and scope of the invention.

What is claimed is:
1. An optical media access device with image scanning function comprising:
    a fixed housing mountable into a computer;
    a moveable housing moveably disposed within said fixed housing;
    a first driving mechanism used to drive said moveable housing to move within said fixed housing;
    an optical media access module disposed within said moveable housing, having an optical head, an optical head driving mechanism, a tray for holding an optical disc, a second driving mechanism to drive said tray, and a rotating mechanism to rotate said optical disc;
    a scanning module mounted closely to the front end of said movable housing to scan document images;

a control panel mounted at the front end of said moveable housing, having a plurality of keys to control the actions of said optical media access device; and a control module for controlling the actions of said optical media access module and said scanning module.

2. An optical media access device as set forth in claim 1, wherein said scanning module includes a CIS module and a document transmission module.

3. An optical media access device as set forth in claim 1, wherein the top and bottom surfaces of the moveable housing are respectively provided with a first and second document channels to allow the passage of the scanning documents.

4. An optical media access device as set forth in claim 3, wherein the front end of the tray is provided with a document funnel, corresponding to the first document channel of the moveable housing, allowing the scanning document to pass through the document funnel.

* * * * *